United States Patent Office 3,424,654
Patented Jan. 28, 1969

3,424,654
RECOVERY OF MICROCOCCAL NUCLEASE
Robert William Hansen, South Bend, Ind., assignor to Miles Laboratories, Inc., Elkhart, Ind., a corporation of Indiana
No Drawing. Filed Apr. 4, 1966, Ser. No. 539,648
U.S. Cl. 195—66    4 Claims
Int. Cl. C12d 1/00

This invention relates to a process for the recovery of micrococcal nuclease. More particularly, it relates to a process of using perchloric acid to precipitate micrococcal nuclease from liquids containing said enzyme.

Micrococcal nuclease is an enzyme which is known to have the property of attacking the 5'-phosphodiester bond of deoxyribonucleic acid (DNA) to depolymerize this acid into 3'-ester groups. It is also known that this enzyme can be produced by incubating *Staphylococcus aureus* on a nutrient medium and then filtering off the dead cells. Various complicated procedures have been employed in the prior art to recover the micrococcal nuclease from the fermentation beer.

One prior art recovery process involved the steps of saturating the fermentation beer with ammonium sulfate for five days followed by centrifugation. The liquid was then discarded. The ammonium sulfate then needed to be removed from the precipitated enzyme. This was accomplished by suspending the solids in water and adding ammonium chloride to saturation and a minor amount of trichloroacetic acid followed by centrifugation. The liquid was discarded and the solids were again suspended in water, treated with ammonium chloride and trichloroacetic acid and centrifuged. The resulting solids then needed further purification to remove the ammonium chloride and trichloroacetic acid. This was accomplished by washing with aqueous ethanol several times. The resulting purified solids were suspended in water and lyophilized.

Another prior art recovery process involved ammonium sulfate precipitation followed by trichloroacetic acid treatment. The resulting solids were then exposed to a two-stage ammonium sulfate precipitation. The resulting solids were then dissolved in water and purified further in a DEAE-cellulose ion-exchange column.

It is an object of the present invention to provide an improved process for the recovery of micrococcal nuclease.

It is a further object of the present invention to provide a micrococcal nuclease recovery process which has fewer processing steps than the recovery processes of the prior art.

In accordance with the present invention, a process is provided for the recovery of micrococcal nuclease which comprises contacting a liquid containing micrococcal nuclease activity with perchloric acid to form an enzyme precipitate and then separating said enzyme precipitate from the remaining liquid. The perchloric acid is added to the liquid containing micrococcal nuclease activity in an amount to form a perchloric acid molar concentration of from 0.25 to about 0.75. Preferably, the perchloric acid molar concentration in the liquid containing micrococcal nuclease activity is about 0.5.

This recovery process generally takes place at room temperature and atmospheric pressure but the temperature and pressure can be varied from these values without any advantages or disadvantages.

The micrococcal nuclease is stable in the presence of the perchloric acid but it is generally desirable to neutralize the material when it is to be stored in the dry form. This can be conveniently carried out by suspending the enzyme precipitate in an alkaline salt solution, dialyzing this suspension against a salt solution and lyophilizing the dialyzate. The resulting solid is stable in the dry state.

The process of the present invention employs a single acid treatment step to recover micrococcal nuclease in a stable form and is thus a substantial improvement over the more complicated recovery procedures of the prior art.

The invention will be further described in the following examples.

EXAMPLE 1

A nutrient medium was prepared by dissolving "Bacto Brain Heart Infusion Dehydrated," a material marketed by Difco Laboratories, in water in the proportions of 37 g. of the dehydrated solids to 1000 ml. distilled water. The resulting solution was then sterilized in an autoclave for 15 minutes at 15 pounds pressure (121° C.). The resulting liquid medium contained the following ingredients per liter:

| | Grams |
|---|---|
| Infusion from calf brains | 200 |
| Infusion from beef heart | 250 |
| Protease-peptone | 10 |
| Bacto-dextrose | 2 |
| Sodium chloride | 5 |
| Disodium phosphate | 2.5 |

To this was then added in an amount of 0.5 percent (weight/volume basis) a yeast extract marketed by Anheuser-Busch, Inc., under the name "Basamin-Busch." It contained amino acids, vitamins, polypeptides and carbohydrates.

Several 300 ml. quantities of the above nutrient medium were inoculated with *Staphylococcus aureus* and incubated in shake flasks for 24 hours at 30–32° C. To a 40 liter capacity fermentor equipped with an agitator and air inlet were added 35 liters of the above described medium containing 0.5 percent (w./v.) of the yeast extract. The medium was then sterilized for 30 minutes at 121° C. The air outlet from the fermentor was connected to an adjacent fermentor filled with steam. The medium was then inoculated with 900 ml. of the above described shake flask cultures. The agitator was operated at 400 r.p.m., aeration commenced at 0.4 volumes/minute and 20 ml. of a sterile commercial anti-foam agent were added. The inoculated medium was then incubated at 30–32° C. for 17 hours. The temperature was raised to 85° C. to kill the culture organism and then cooled to room temperature. There was no aeration and minimal agitation during this heating and cooling. The fermentation beer was then filtered to remove the cells. The filtrate was then concentrated about 10 fold by heating at 25°–30° C. under about 28–29 in. mercury vacuum. This concentrate had a specific gravity of 1.1085 and contained 328.1 mg. of solids/ml. It also contained 480,000 units of enzyme activity per gram of solids. This activity of the micrococcal nuclease was assayed according to the procedure described in J. Am. Chem. Soc. 78, 4642 (1956). The assay samples were 10 ml. instead of the 0.7 ml. quantities employed in the reference article procedure. A 182 ml. portion of this concentrate was adjusted to a perchloric acid molarity of 0.5 by the addition of 60.0 ml. of 2.0 M perchloric acid. The perchloric acid was added slowly with stirring at room temperature. The resulting enzyme-perchloric acid percipitate was collected by centrifugation at 2000 r.p.m. for 20 minutes at room temperature. The supernatant liquid was discarded. The precipitate was suspended in 75 ml. of an alkaline sodium chloride solution. This was a 0.9 weight percent aqueous sodium chloride solution containing 1.0 weight percent sodium carbonate. The solution containing the suspended enzyme precipitate was then dialyzed against 14 liters of 0.2 M sodium chloride for 20 hours at 2°–4° C. The dialyzate was lyophilized and the resulting powdered enzyme was assayed to contain 5,860,000 activity units of micrococcal nuclease per gram of solids. There was an overall recovery of 32.9 percent of the enzyme activity originally present in the concentrate. This powdered enzyme was then used in a well known manner to depolymerize DNA.

Example 2

A micrococcal nuclease fermentation beer enzyme concentrate was prepared in a manner similar to that described in Example 1 above. Four portions of this concentrate were then separately mixed with various amounts of perchloric acid to produce final perchloric acid molar concentrations of 0.25, 0.5, 0.75 and 1.0, respectively. The resulting precipitates were then removed by filtration. The filtrates were then assayed for micrococcal nuclease activity. The activity assays were then compared with an untreated concentrate. The results are shown below:

| Sample | Enzyme activity, units/ml. | Percent original activity in filtrate |
| --- | --- | --- |
| Control (no acid treatment) | 22,500 | 100 |
| 0.25 M | 8,200 | 36.8 |
| 0.5 M | 1,050 | 4.7 |
| 0.75 M | None | 0 |
| 1.0 M | None | 0 |

It can thus be seen that 0.25 molar perchloric acid collects 63.2 percent of the enzyme activity in the form of an easily recoverable percipitate. A 0.5 molar perchloric acid treatment collects 95.3 percent of the enzyme activity, while perchloric acid concentrations above about 0.5 molar form precipitates containing all of the enzyme activity.

What is claimed is:

1. A process for the recovery of micrococcal nuclease which comprises contacting a liquid containing micrococcal nuclease activity with perchloric acid to form a perchloric acid molar concentration of from about 0.25 to about 0.75 to form an enzyme precipitate and then separating said enzyme precipitate from the remaining liquid.

2. A process according to claim 1 wherein the perchloric acid is added to the liquid containing micrococcal nuclease activity in an amount to form a perchloric acid molar concentration of about 0.5.

3. A process according to claim 1 wherein the liquid containing micrococcal nuclease activity is a fermentation beer which has been heated under vacuum to form a liquid enzyme concentrate, wherein said liquid is contacted with perchloric acid to form said enzyme precipitate, and wherein the separated precipitate is suspended in alkaline salt solution and dialyzed against salt solution, and the dialyzate is lyophilized to form a micrococcal nuclease powder.

4. A process according to claim 3 wherein the perchloric acid is added to the liquid containing micrococcal nuclease activity in an amount to form a perchloric acid molar concentration of about 0.5.

References Cited

UNITED STATES PATENTS 3,135,667   6/1964   Nakanishi et al. _____ 195—66

OTHER REFERENCES

Biochemica and Biophysica Acta, vol. 55 pp. 664–673 (1962).

LIONEL M. SHAPIRO, *Primary Examiner.*